June 22, 1971 H. M. GAJEWSKI ET AL 3,585,647
ANTITHROMBOGENIC ARTICLE AND PROCESS
Filed April 25, 1968
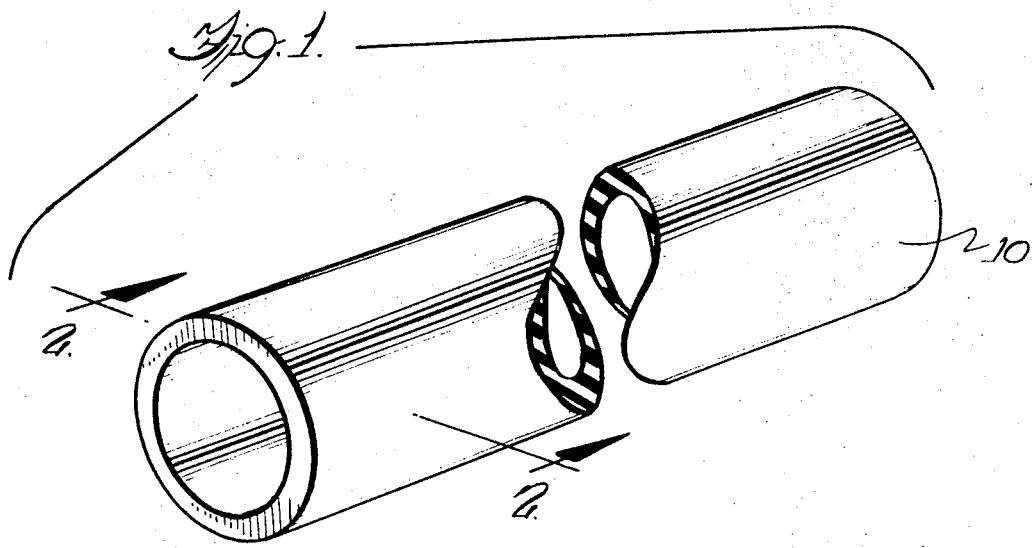
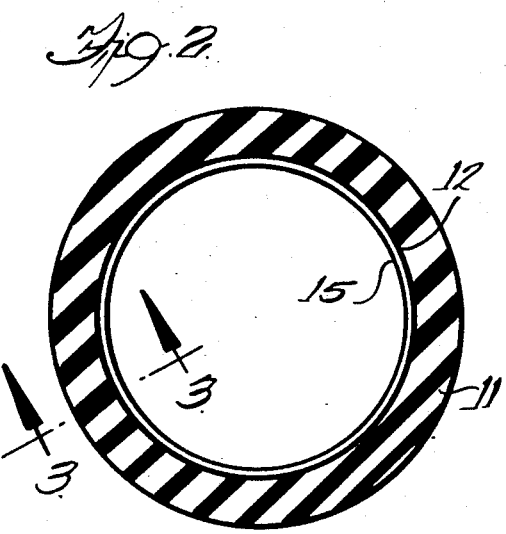
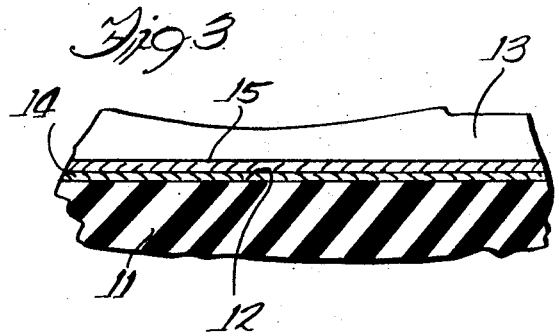
Inventors
Henry M. Gajewski
Clarence J. Idowski
by Richard J. Reilly
Atty

United States Patent Office 3,585,647
Patented June 22, 1971

3,585,647
ANTITHROMBOGENIC ARTICLE AND PROCESS
Henry M. Gajewski, Morton Grove, and Clarence Gdowski, Cicero, Ill., assignors to Baxter Laboratories, Inc., Morton Grove, Ill.
Filed Apr. 25, 1968, Ser. No. 724,155
Int. Cl. A61f 1/24
U.S. Cl. 3—1
12 Claims

ABSTRACT OF THE DISCLOSURE

A flexible article obtains an anticoagulating character enabling handling of, or contact with, blood by reason of securance of heparin to the surface of the article through the medium of a thereto vulcanized surface cover fabricated from silicone resin with therein entrapped inorganic adsorbant for holding an anticoagulant for blood.

---

This invention relates to antithrombogenic articles. Particularly it relates to flexible articles having antithrombogenic characteristics. Specially it relates to antithrombogenic rubber and process for same.

Heretofore it has been known to connect an anticoagulant from the surface of a biologically inert material to impart antithrombogenic characteristics to a therefrom fabricated article for handling or contacting blood. The connection is accomplished through the medium of a graphite coat on which benzalkonium chloride is adsorbed for ionic combination with heparin, an anticoagulant for blood. However, a device or an appliance resulting from heretofore known technology is unable to retain structural integrity when flexed or otherwise bent because of graphite shedding or flaking, when thus distorted. In consequence thereof such device loses heparin holding ability. Accordingly, an intracorporeal mechanism such as a heart valve and an extracorporeal device such as tubing for transmitting blood under intermittently varying pressure if fabircated by a conventional technique will lose their antithrombogenic character according to the levels of physical distortion thereof.

Silicon rubber, particularly, except for its thrombogenic character, otherwise is widely acknowledged as highly suited for handling, managing or otherwise contacting blood tissue. For example, silicone rubber in addition to being biologically inert, is readily flexible and is adapted for transporting blood and fabrication of blood contacting devices. A heparin coating on the silicone rubber improves its antithrombogenic characteristics. However, heparin becomes only poorly bonded to silicone rubber when heretofore known art is used, in consequence of which an otherwise good material for blood handling is not entirely satisfactory.

It is an object of the present invention to provide an improved antithrombogenic article and process.

It is another object of the invention to impart improved antithrombogenic characteristics to a flexible article.

It is an additional object of the invention to enable blood to be handled without clotting in intracorporeal and extracorporeal devices.

It is a further object of the invention to bind heparin to the blood contacting surface of a flexible material.

It is yet a further object of the invention to prevent formation of thrombi from blood by reason of contact with a flexible article.

To effect the foregoing objects, an article of manufacture for use in managing blood in a flowable state is fabricated with a solid base. A flexible cover of silicone resin is bonded on the surface of the base; and an adsorbant for the anticoagulant is carried within the cover for holding an anticoagulant for blood about said base.

How to further achieve the foregoing and other objects, features and advantages of the invention will become more apparent upon consideration of the following description and appended claims, when considered in conjunction with the accompanying drawings wherein the same reference character or numeral refers to like or corresponding parts throughout the several views.

On the drawings:
FIG. 1 is a length of tubing embodying one form of the present invention said length being shown broken apart.
FIG. 2 is a view according to line 2—2 of FIG. 1.
FIG. 3 is a view according to line 3—3 of FIG. 2.

Referring now more particularly to the drawings, an article 10 for use in managing blood in a flowable state is shown as a length of tubing. However, neither article 10 nor the invention is limited to a tube inasmuch as the illustrated article merely is representative of a class of flexible members efficient for blood handling. For example, if the article is in the form illustrated, it may be employed as a conduit for blood flow of a character conventionally encountered in extracorporeal blood oxygenation apparatus used during heart surgery. On the other hand, article 10 may be leaf-like in configuration for use intracorporeally, for example, as an artificial heart valve.

Article 10 comprises a solid, flexible base 11 which may be of elastomeric, preferably silicone rubber, fabrication. The latter is preferred because of its high level of tissue compatibility. Base 11 has a surface 12 which is arranged for disposition adjacent flowing blood. Herein, surface 12 defines lumen 13 of the tube comprising article 10.

A biologically inert cover 14 which is fabricated from any flexible silicone resin is connected by vulcanization on surface 12 for holding an anticoagulant, heparin, over said surface to prevent clot formation from blood which flow past said surface in contact with said cover. Silicone resins employed in this invention are distinguishable from silicone rubber, as is well known, in that in the resin the ratio of organic groups to silicon is less than 1.8 to 1, whereas in rubber it is normally 2.0 to 1. To improve adhesion of poorly bondable resins to base 11 any suitable primer, preferably one of a non-toxic nature, and more preferably one which has Food and Drug Adminstration approval may be used.

The anticoagulant is held through the agency of an adsorbant which is intimately mixed with and imbedded in the cover. Suited as adsorbants are particulates of inorganic materials having large surface areas including silica and various carbonaceous substances, such as channel black, lamp black, conductive carbon and graphite. The latter is preferred because of the relatively large surface areas which can be easily obtained by reason of which the proportion of adsorbant to resin may be minimized for obtaining desired anticoagulating character. This feature is important because to obtain a suitable antithrombogenic article 10 requires heavy loading of the resinous cover with adsorbant. For example, when using an adsorbant divided to semicolloidal size, its ratio to resin to obtain a desirable antithrombogenic effect is about at least 1 to 1.1. Preferably it is as high as possible without impairing the integrity of the cover.

The combination of base 11 and cover 14 with therein imbedded adsorbant comprise a complete article of commerce without an anticoagulant connected thereto. The latter can be added shortly prior to use of the article for blood handling. To impart antithrombogenic characteristics to article 10, surface 12 is properly conditioned with heparin through the medium of a cationic surface active agent, such as cetyl pyridinium chloride, di-polyoxyethylene-n-alkyl phosphonate, or benzalkonium chloride that easily connects onto the adsorbant and with any of which heparin ionically combines. The latter is preferred because it is a well-known, easily available, surgical disinfectant.

The adsorbant, when combined in article 10 in the manner described, is retained on base 11 notwithstanding its flexion, bending or other distortion in normal use as a blood handling article. Moreover a complete antithrombogenic article according to the present invention retains its integrity during normal use and holds heparin when combined according to the invention.

A preferred process for an antithrombogenic article according to the invention first provides a master slurry composed according to the following table:

| | Grams |
|---|---|
| A dispersion of semicolloidal graphite in about an equal amount of an aromatic solvent | 20 |
| Toluene | 80 |
| A flexible silicon resin solution of about 55% solids in toluene (sold as "SR-126" by General Electric Silicone Products Division) | 20 |

The components of the master slurry are blended in a high speed blender for about 15 minutes while chilled in an ice bath. To insure uniform consistency it is preferable to agitate the master slurry after blending. Thereafter, one volume of the master slurry is diluted with an equal volume of exylene to provide a coating composition. The latter is blended in a high speed blender for about five minutes while chilled in an ice bath, following which it is agitated to assure uniform consistency.

Surface 12 of article 10, which is to be coated, is rinsed with toluene. This washes away surface impurities and simultaneously causes the surface molecules of base 11 to swell. When the base 11 is in tubular form, as illustrated, one end of the tube is sealed after treatment with toluene and the aforesaid coating is poured into the tube and allowed to remain in contact with surface 12 for one minute, after which the coating composition is drained. Thereafter, the coating composition remaining on surface 12 is air dried for evaporating the aromatic solvents and toluene. There then remains a cover 14 of flexible silicone resin which serves as a binder for therein entrapped or imbedded graphite particles bonded on surface 12. Cover 14 is then cured to the base 11 by heating for one hour at 400° F. The high proportion of graphite in the cover does not interfere with the cure. A second cover may be applied to the surface of the first cover by the same coating process used to apply the first cover except that then the cure period for the first cover need then be only about 10 minutes.

To couple heparin 15 to cover 14, after its bonding to base 11, said cover is immersed in a 1:1000 aqueous benzalkonium chloride for at least four hours and then rinsed in saline. The resulting product is then bathed for about two hours in heparinized saline, a preferred solution of which comprises 0.63 milligram of heparin per cubic centimeter of saline for two hours. In consequence of the foregoing steps, surface 12 is covered with benzalkonium chloride by adsorption on the graphite; and thereafter heparin is connected to the benzalkonium ions, accordingly, to produce an article having an antithrombogenic surface covering.

As many substitutions or changes could be made in the above described article and process, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In an article for contact with blood in a flowable state, a combination comprising:
   a solid base;
   a cover of silicone resin bonded on said base, the ratio of organic groups to silicon atoms in said resin being less than 1.8 to 1; and an adsorbent selected from the group consisting of silica and carbon carried within said cover for holding an anticoagulant for blood about said base.

2. A combination according to claim 1 in which the base is a silicone elastomer.

3. A combination according to claim 2 in which the cover is a flexible silicone resin, the adsorbant being finely divided carbon imbedded in said cover.

4. A combination according to claim 3 in which the adsorbant is carbon in an amount bearing a ratio to the amount of said silicone resin of about at least 1 to 1.1.

5. A combination according to claim 4 in which the carbon is semicolloidal graphite.

6. A combination according to claim 1 further characterized by a cationic surface active agent connected on said adsorbant for combination with heparin.

7. The combination of claim 1 having a cationic surface active agent on said adsorbant; and a layer of heparin coupled to said surface active agent.

8. The combination according to claim 7 in which said cationic surface active agent is benzalkonium chloride.

9. The combination according to claim 7 in which said cationic surface active agent is cetyl pyridinium chloride.

10. The combination of claim 1 in which said article comprises a tubular shape.

11. The combination of claim 3 in which said article comprises a tubular shape.

12. The combination of claim 3 having a cationic surface active agent on said adsorbent, and a layer of heparin coupled to said surface active agent.

References Cited

UNITED STATES PATENTS 3,453,194   7/1969   Bennett et al. _____ 204—159.12

OTHER REFERENCES

Gott et al.: Transactions Amer. Soc. Artific. Inter. Organs, vol. X, 1964, pp. 213–217.

Hufnagel et al.: Surgery, vol. 61, # 1, pp. 11–16.

DALTON L. TRULUCK, Primary Examiner

U.S. Cl. X.R.
128—334; 161—206